(12) United States Patent
Muhlbauer

(10) Patent No.: US 8,075,271 B2
(45) Date of Patent: Dec. 13, 2011

(54) ELECTROHYDRAULIC PROPELLER GOVERNOR

(75) Inventor: Gerd Muhlbauer, Mitterfels (DE)

(73) Assignee: MT-Propeller Entwicklung GmbH, Atting (DE)

( * ) Notice: Subject to any disclaimer, the term of this patent is extended or adjusted under 35 U.S.C. 154(b) by 718 days.

(21) Appl. No.: 12/283,755

(22) Filed: Sep. 16, 2008

(65) Prior Publication Data

US 2009/0180876 A1 Jul. 16, 2009

(30) Foreign Application Priority Data

Jan. 11, 2008 (DE) .................... 10 2008 004 196

(51) Int. Cl.
*B63H 3/08* (2006.01)
*B64C 11/38* (2006.01)

(52) U.S. Cl. .................. 416/157 R; 416/44; 416/46

(58) Field of Classification Search ............ 416/31, 416/44, 46, 47, 52, 156, 157 R
See application file for complete search history.

(56) References Cited

U.S. PATENT DOCUMENTS

| 4,286,923 | A | * | 9/1981 | Gross | 416/43 |
|---|---|---|---|---|---|
| 4,893,989 | A | * | 1/1990 | Carvalho | 416/157 R |
| 4,901,746 | A | * | 2/1990 | Metcalf | 137/48 |
| 4,928,241 | A | * | 5/1990 | Day | 701/3 |
| 5,037,271 | A | * | 8/1991 | Duchesneau et al. | 416/47 |
| 5,061,153 | A | * | 10/1991 | Pace et al. | 416/46 |
| 5,141,399 | A | * | 8/1992 | Duchesneau et al. | 416/157 R |
| 5,174,718 | A | * | 12/1992 | Lampeter et al. | 416/48 |
| 5,186,608 | A | * | 2/1993 | Bagge | 416/37 |
| 6,077,040 | A | * | 6/2000 | Pruden et al. | 416/45 |
| 6,196,801 | B1 | * | 3/2001 | Muhlbauer | 416/157 R |

* cited by examiner

*Primary Examiner* — Chris Chu

(74) *Attorney, Agent, or Firm* — Schwegman, Lundberg & Woessner, P.A.

(57) ABSTRACT

Proposed is a hydraulically controlled variable pitch propeller system for air, land or water craft, comprising an engine, an engine controller, a rotating propeller featuring at least two propeller blades (16), for the pitch control of which a propeller governor (30) is provided connecting the propeller (10) via at least one hydraulic line and comprising a governor body (32) housing a control spool (46) the position of which is determined by the cooperation of flyweights (40) rotating by means of the engine and a variably biased governor spring (48) supported by the control spool (46). In accordance with the invention, the propeller governor (30) comprises an electric motor (58) which sets the preload of the governor spring (48) for the desired rpm and is electrically connected to the engine controller.

8 Claims, 3 Drawing Sheets

ELECTROHYDRAULIC PROPELLER GOVERNOR

RELATED APPLICATIONS

The present application claims priority under 35 U.S.C. 119 to German Patent Application No. 10 2008 004 196.3, filed Jan. 11, 2008, which is hereby incorporated by reference.

The invention relates to a hydraulically controlled variable pitch propeller system for air, land or water craft having the features as set forth in the preamble of claim 1.

One such propeller system is known in practice to comprise an engine for powering a propeller having at least two variable pitch propeller blades. This is done by means of fixed controller consequently forming a propeller governor as a hydraulic means with which the pitch of the propeller blades can be adapted to the operating mode in each case. Existing propeller governors comprise an arm acting on a governor spring for positioning a control spool, the spring being supported by the spool. The position of the control spool dictates the pressure acting on a servo piston for varying the pitch of the propeller blades. The adjusting arm of the propeller governor is mechanically connected to a control lever in the cockpit of the aircraft for manual control by the pilot. This means that the pilot has the task of defining propeller RPM. Existing propeller governors thus work mechanically and hydraulically in combination, their activating control being mechanical.

More advanced engines for powering the propeller often require engine power and RPM to be controlled electronically as a function of a variety of parameters to optimize performance in any required operating condition. This is not possible with existing propeller governors working mechanically and hydraulically in combination.

The invention is based on the object of defining a hydraulically controlled variable pitch propeller system of the type as recited at the outset which is provided with a propeller governor permitting activation control of the propeller system with optimized ease of operation.

This object is achieved by the hydraulically controlled variable pitch propeller system having the features as set forth in claim 1.

In accordance with the invention there is consequently provided a hydraulically controlled variable pitch propeller system for air, land or water craft, comprising an engine, an engine controller, a rotating propeller featuring at least two propeller blades, for the pitch control of which a propeller governor is provided connecting the propeller via at least one hydraulic conduit and comprising a governor housing a control spool the position of which is determined by the cooperation of flyweights powered rotating by means of the engine and a variably biased governor spring supported by the control spool. The propeller governor comprises an electric motor which sets the bias of the governor spring and is electrically connected to the engine controller.

Engineering a propeller system in accordance with the invention eliminates the need of a mechanical connection from a cockpit control to the governor usually mounted on the engine. Instead the governor spring and thus the hydraulic pressure for pitch control can be handled by Full Authority Digital Engine Control (FADEC), i.e. the engine controller commands are translated from the electric motor into actuation of the propeller governor. This considerably enhances ease of operation of an aircraft since it permits a single power lever control of the air, land or water craft involved, thus relieving the strain on the pilot or operator.

The control representing the propeller governor engineered in accordance with the invention now permits control of the propeller being fully electronic so that also fuel consumption can be optimized in keeping with the output of the engine as selected in each case. Where aircraft are concerned this also includes various parameters such as air density, external temperature and flight speed, in which also variations in engine and propeller RPM play an important role.

In one special embodiment of the propeller system the electric motor acts via a lever arm on a bearing block for the governor spring. By means of the lever arm an increase or reduction in the transmission ratio of the positioning action exerted by the electric motor, particularly when linear, may occur. In this case a mechanical means is provided for communicating the control commands from the electronic engine controller via the electric motor to the biased governor spring responsible for governing propeller RPM differing as a function of the bias.

For flexibility in installing the governor in the region of an engine casing the governor may feature a rotatable head for mounting the electric motor and the lever arm.

To limit the RPM of the propeller to a maximum and/or minimum RPM it is of advantage when the lever arm cooperates with at least one stop defining a minimum and/or a maximum RPM of the propeller, i.e. the stops for the lever arm ensuring that engine RPM remains safe even when the electronic input of the engine malfunction.

Preferably, the stops are engineered adjustable. More particularly, each stop may be formed by a stopscrew penetrating the header housing accommodating the lever arm. Preferably the stopscrews are arrested from turning out of place to prevent unwanted positioning of each stop. The stopscrews permit setting the values limiting propeller RPM on the outside of the governor, i.e. without requiring the casing of the controller to be opened up.

Preferably the electric motor is secured to the header housing accommodating the lever arm.

To perform feathering of the propeller blades, particularly on a multi-engine aircraft, i.e. to minimize drag with the engines stopped, the governor of the propeller system in accordance with the invention preferably comprises a solenoid valve, opening of which reduces the hydraulic pressure acting on a servo piston so that system pressure is effectively rendered zero and the propeller blades automatically feather due to the effect of the springs and counterweights. On a return from feathering this solenoid valve is closed.

To always ensure an adequate supply of hydraulic pressure for example in flight, to start the engine after feathering, it is provided for to advantage that the propeller system in accordance with the invention comprises an oil accumulator with an additional solenoid valve that fluidly communicates with the governor so that opening of the solenoid valve reduces the pitch of the propeller blades to ensure reliable engine starting in flight.

On a multi-engine air, land or water craft it may be desired to synchronize propeller blade RPM. This is achievable by digital engine control cooperating with the electric or servo motors of the governors assigned to each propeller constituting Full Authority Digital Engine Control (FADEC) or an external electronic control.

Further advantages and advantageous aspects of the subject matter of the invention read from the description, the drawing and the claims.

An example aspect of a hydraulically controlled variable pitch propeller system in accordance with the invention will now be detained with reference to its simplified illustration in the drawing in which.

Figure 1:
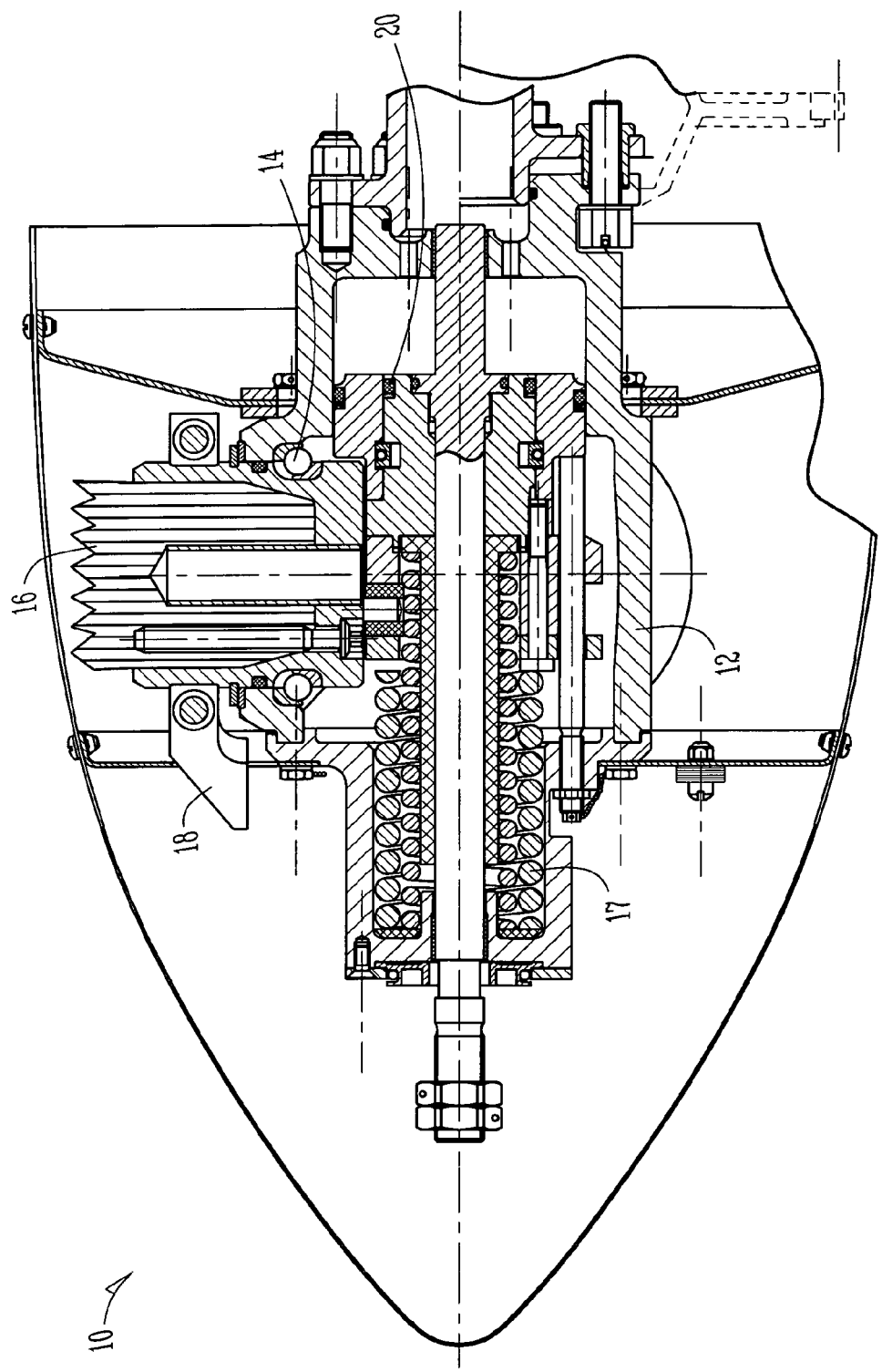
FIG. 1 is a longitudinal section through a propeller hub portion.

Referring now to FIG. 1 there is illustrated a hydraulically controlled variable pitch propeller assembly comprising a propeller hub 12 and at least two propeller blades 16 each assigned bearings 14. Provided at each propeller blades 16 is a flyweight 18 which together with springs 17 feathers the corresponding propeller blades 16. For powered rotation of the propeller 10, the propeller hub 12 is connected to an engine of an aircraft or other vehicle.

Figure 3:
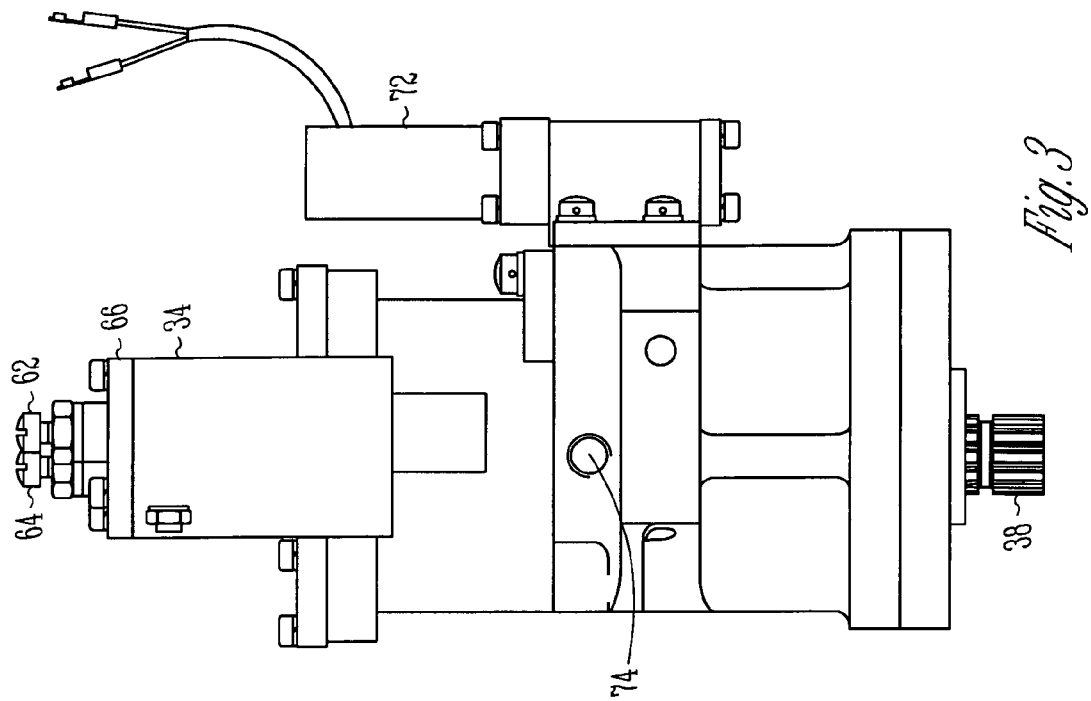
FIG. 3 is a second side view of the propeller governor.
Figure 2:
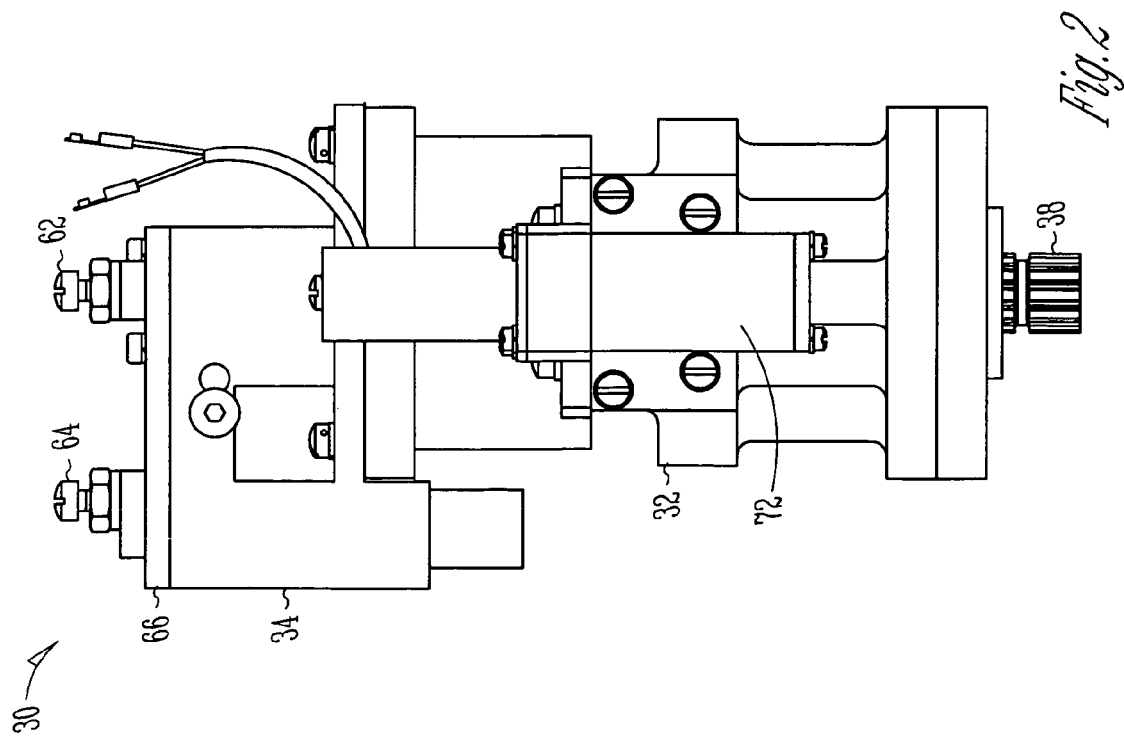
FIG. 2 is a first side view of a propeller governor for varying propeller pitch.
Figure 4:
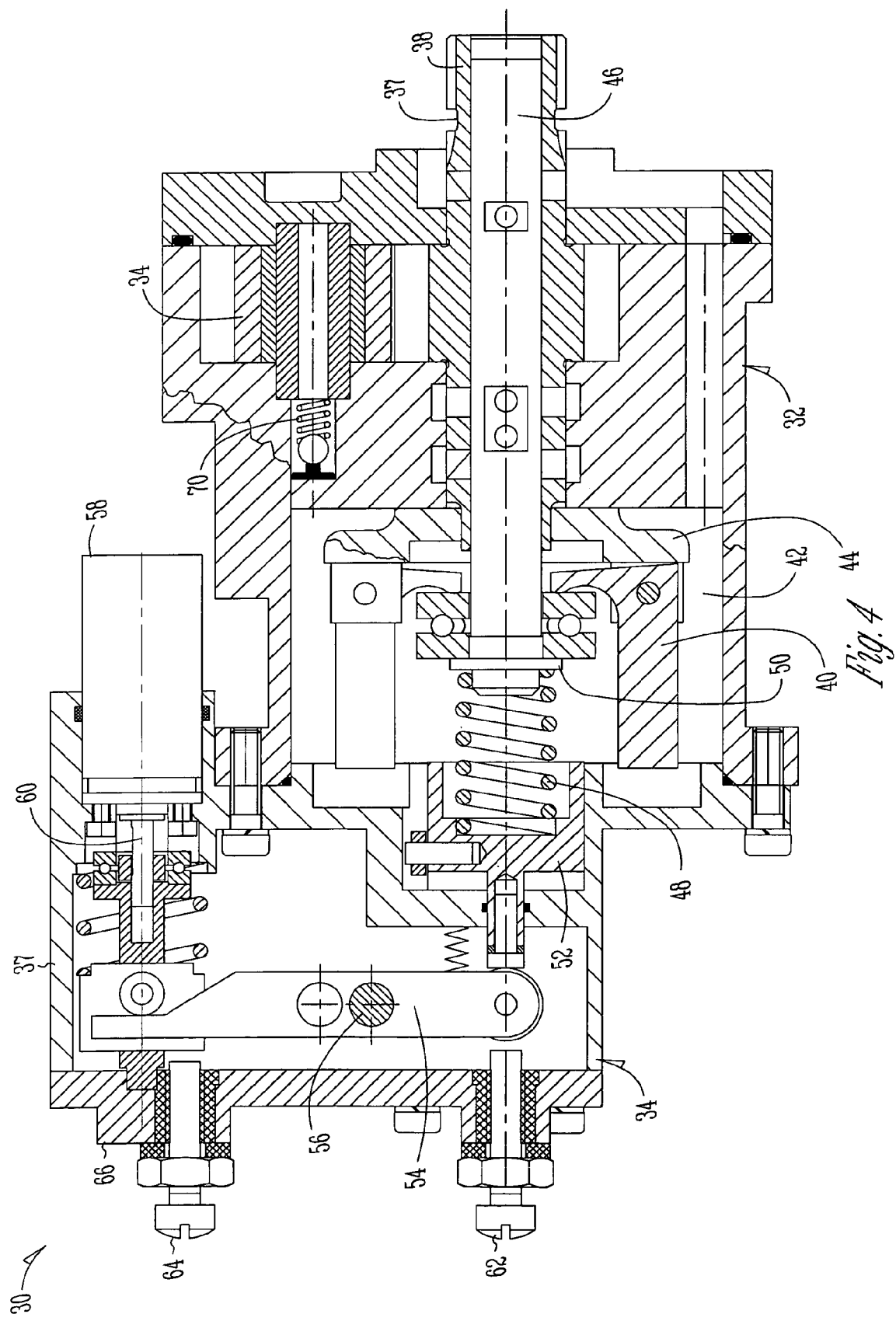
FIG. 4 is a longitudinal section through the propeller governor.

Provided furthermore in the propeller hub 12 is a servo piston 20 by means of which the pitch of the propeller blades 16 can be varied. Displacement of the servo piston 20 occurs hydraulically. For this purpose a cylinder space in which the servo piston 20 is guided and hydraulically connected to a propeller governor 30 serving as a control shown in detail in FIGS. 2 to 4.

The propeller governor 30 comprises a governor body 32 made of metal and a governor head 34 with a head housing 36. The governor body 32 contains a gear pump 34 which uses hydraulic fluid, pumped from the engine, to increase the servo pressure between 18 and 42 bar. To vary the pitch of the propeller blades 16 the servo piston 20 is moved by this servo pressure.

Furthermore included in the governor body 32 is a drive shaft 37 powered by the engine via a coupling member 38 and which drives flyweights 40 arranged in a governor space 42. The flyweights 40 are pivotally mounted on a rotating plate 44 connected to the drive shaft 37.

Axially sliding, guided in the drive shaft 37 is a valve or control spool 46, which controls the servo pressure supplied to the servo piston 20 in the hub 12 of the propeller 10.

At its end facing away from the coupling member 38 the control spool 46 is biased by means of a governor spring 48. The governor spring 48 is supported at one end by a support 50 connecting the control spool 46 and at its other end by a bearing sleeve 52, at the position which dictates the preload of the governor spring 48.

The bearing sleeve 52 installed in the governor head 34 is connected to a lever arm 54 pivotally mounted at an axis 56 which can be moved by means of an electric motor 58 fitted to the governor head 34. The electric motor 58 connected to an engine controller has an axially displaceable or translationally working shaft 60 acting on the lever arm 54 so that when pivoted it displaces the bearing sleeve 52 supporting the governor spring 48 and changing the preload of the spring.

Provided furthermore at the governor head 34 are two setscrews 62, 64 penetrating a cover 66 of the governor head 34 and of which the setscrew 62 forms a mechanical stop for the lever arm 54 defining a minimum RPM of the propeller 10, and the setscrew 64 forming a mechanical stop for the lever arm 54 defining a maximum RPM of the propeller, or vice-versa.

Configured furthermore in the governor body 32 is a pressure-relief valve 70 which can be set to a desired servo pressure in the range between 18 and 42 bar which opens to dump hydraulic fluid in case of overpressure from the propeller governor 30.

Configured furthermore at the propeller governor 30 is a solenoid valve capable of dumping the pressure in the hydraulic line to the servo piston 20, when actuated automatically feather the propeller blades 16 by the effect of the counterweights and springs 17 assigned to the propeller blades 16.

Provided furthermore at a sidewall of the body 32 is a port 74 for connecting a hydraulic accumulator provided with an additional solenoid valve which can the propeller blades 16 return from feathering into the operating condition. By opening the solenoid valve, hydraulic pressure is moving the piston 20 in the hub 12 of the propeller 10.

It will be assumed, of course, that the governor as described, can also be used with propellers not engineered for feathering.

The invention claimed is:

1. A hydraulically controlled variable pitch propeller system for air, land or water craft, comprising an engine, an engine controller, and a rotating propeller having at least two propeller blades, for the pitch control of which a propeller governor is provided connecting the propeller via at least one hydraulic line and comprising a body housing a control spool the position of which is determined by cooperation of flyweights rotating by means of the engine and a variably biased governor spring supported by the control spool, wherein the propeller governor comprises an electric motor which sets a preload of the governor spring and is electrically connected to the engine controller.

2. The hydraulically controlled variable pitch propeller system as set forth in claim 1, wherein the electric motor acts via a lever arm on a bearing block for the governor spring.

3. The hydraulically controlled variable pitch propeller system as set forth in claim 2, wherein the lever arm cooperates with at least one stop defining a minimum and/or a maximum RPM of the propeller.

4. The hydraulically controlled variable pitch propeller system as set forth in claim 3, wherein the stop includes a stopscrew penetrating the governor head and contacting the lever arm.

5. The hydraulically controlled variable pitch propeller system as set forth in claim 1, wherein the electric motor is installed on the governor head.

6. The hydraulically controlled variable pitch propeller system as set forth in claim 1, wherein a solenoid valve, when opened, will feather the propeller blades.

7. The hydraulically controlled variable pitch propeller system as set forth in claim 1, wherein a solenoid valve installed at the hydraulic accumulator, when opened, supplies oil pressure to the piston in order to reduce the pitch of the propeller blades (unfeather).

8. The hydraulically controlled variable pitch propeller system as set forth in claim 1, for an air, land or water craft equipped with at least two propellers, each connected to an electrically controlled propeller governor which for actuation is provided with an electric motor, the synchronization of the propellers achieved by means of the engine controller or a separate control, for activation of the electric motor of the propeller governor.

* * * * *